United States Patent [19]

Worley

[11] Patent Number: 4,874,532

[45] Date of Patent: Oct. 17, 1989

[54] METHOD FOR DECONTAMINATION OF TOXIC CHEMICAL AGENTS

[75] Inventor: Shelby D. Worley, Auburn, Ala.

[73] Assignee: PPG Industries, Inc., Pittsburgh, Pa.

[21] Appl. No.: 212,822

[22] Filed: Jun. 29, 1988

[51] Int. Cl.[4] .................................................. C02F 1/58

[52] U.S. Cl. .................................... 210/755; 210/909; 210/911

[58] Field of Search ........................ 210/673, 753-755, 210/764, 908, 909, 911; 134/42; 137/8

[56] References Cited

U.S. PATENT DOCUMENTS

| | | | |
|---|---|---|---|
| 4,659,484 | 4/1987 | Worley et al. | 210/764 |
| 4,681,948 | 7/1987 | Worley | 548/319 |
| 4,698,165 | 10/1987 | Theyson | 210/764 |
| 4,767,542 | 8/1988 | Worley | 210/755 |
| 4,775,484 | 10/1988 | Schmidt et al. | 210/673 |
| 4,784,699 | 11/1988 | Cowsar et al. | 134/42 |
| 4,797,128 | 1/1989 | Fowler | 8/137 |

*Primary Examiner*—Tom Wyse

*Attorney, Agent, or Firm*—Irwin M. Stein

[57] ABSTRACT

N,N'-dihalo-2-imidazolidinones are described as decontaminants for toxic chemical agents such as the sulfur mustards. Decontamination is effected by contacting the toxic chemical agent with a decontaminating amount of the N,N'-dihalo-2-imidazolidinone, e.g., 1,3-dichloro-4,4,5,5-tetramethyl-2-imidazolidinone.

11 Claims, No Drawings

METHOD FOR DECONTAMINATION OF TOXIC CHEMICAL AGENTS

CROSS REFERENCE TO RELATED APPLICATIONS

This application is related to my U.S. application Ser. No. 113,941, filed Oct. 28, 1987, U.S. Pat. No. 4,767,542, which is a continuation-in-part of my application Ser. No. 15,480, filed Feb. 17, 1987, now abandoned.

DESCRIPTION OF THE INVENTION

The use of toxic chemicals in wartime, particularly during World War I, has been well documented. Although chemical warfare has not been used on a large scale since that time, there is continued interest in the development of improved decontamination chemicals to defense against the possible use of toxic chemical agents, such as the sulfur mustards and nerve agents, e.g., VX.

Currently, the decontaminant of choice is supertropical bleach (STB), which is a white powder containing about 30 percent available chlorine in the form of calcium hypochlorite. STB may be used either as a dry mix or as an aqueous slurry to decontaminate exterior surfaces and ground that has become contaminated with chemical toxic agents. STB deteriorates with time and accordingly must be replaced every few years. Further, STB is more soluble in aqueous media than in organic media and, therefore, is less effective as a decontamination agent against toxic organic chemical substances that are disseminated in an aqueous medium.

It has now been discovered that N,N'-dihalo-2-imidazolidinones may be used as a decontaminating chemical reagent against toxic chemical agents such as the blister agents, e.g., the sulfur mustards. Alkaline solutions or emulsions of the N,N'-dihalo-2-imidazolidinones may also be used as a decontaminant for toxic nerve agents, e.g., the VX and the G series of nerve agents. The aforedescribed 2-imidazolidinones are relatively stable in storage and are significantly more soluble in organic solvents, such as tetrachloroethylene, than is STB. Moreover, removal of excess quantities of 2-imidazolidinone compounds may be readily accomplished by rinsing with water following a successful decontamination operation. Further, they are much less corrosive to metal than compounds that liberate free chlorine, such as STB, and hence can be used to wash down military equipment made of corrodible metals.

DETAILED DESCRIPTION OF THE INVENTION

The N,N'-dihalo-2-imidazolidinones described herein are five membered ring compounds that may be represented by the following graphic formula I:

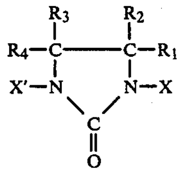

(I)

wherein X and X' are each halogen selected from the group chlorine and bromine, provided that at least one of X and X' is chlorine, $R_1$, $R_2$, $R_3$ and $R_4$ are each selected from the group consisting of hydrogen, $C_1$–$C_4$ alkyl, $C_1$–$C_4$ alkoxy, hydroxy and substituted phenyl, particularly para-substituted phenyl, wherein said phenyl substituents are each selected from the group consisting of $C_1$–$C_4$ alkyl, $C_1$–$C_4$ alkoxy and hydroxy; provided, further, that not more than one of the substituents $R_1$–$R_4$ is hydrogen. The number of phenyl substituents may range from 1 to 2 substituents.

The alkyl substituents attached to the ring of the 2-imidazolidinone compounds or to the phenyl substituent may contain from 1 to 4 carbon atoms; namely, methyl, ethyl, propyl, isopropyl and the butyls, e.g., n-butyl, isobutyl, and secondary butyl. Similarly, the alkoxy substituents attached to the ring or the phenyl substituent may contain from 1 to 4 carbon atoms; namely, methoxy, ethoxy, propoxy, isopropoxy and butoxy, e.g., n-butoxy, isobutoxy, and secondary butoxy.

N,N'-dihalo-2-imidazolidinones described herein include those in which at least 3 of the 4 substituents (namely $R_1$–$R_4$) on the carbon atoms at the 4 and 5 positions of the ring are chosen from the described alkyl, alkoxy, hydroxy, or substituted phenyl substituents. Preferably, all four of the substituents are chosen from said group of substituents. Thus, N,N'-dihalo-2-imidazolidinone derivatives contemplated herein are tri- and tetra-substituted N,N'-dihalo-2-imidazolidinones. More preferably, the $R_1$–$R_4$ substituents and the phenyl substituents are $C_1$–$C_4$ alkyl groups, i.e., methyl and ethyl groups. Still more preferably, $R_1$–$R_4$ are methyl groups.

Examples of the aforedescribed dihalo-2-imidazolidinone compounds include, but are not limited to:

1-bromo-3-chloro-4,4,5,5-tetramethyl-2-imidazolidinone;
1,3-dichloro-4,5,5-trimethyl-2-imidazolidinone;
1,3-dichloro-4,4,5,5-tetramethyl-2-imidazolidinone;
1,3-dichloro-4-methoxy-4,5,5-trimethyl-2-imidazolidinone;
1,3-dichloro-4-hydroxy-4,5,5-trimethyl-2-imidazolidinone;
1,3-dichloro-4-ethyl-4,5,5-trimethyl-2-imidazolidinone;
1,3-dichloro-4,4-diethyl-5,5-dimethyl-2-imidazolidinone; and
1,3-dichloro-4,4,5,5-tetraethyl-2-imidazolidinone.

By substituting other described substituents for one or more of the named $R_1$–$R_4$ substituents, i.e., methyl, ethyl, methoxy, hydroxy, etc., other corresponding named N,N'-dichloro-, dibromo- or bromochloro-2-imidazolidinone derivatives may be named.

N,N'-dihalo-2-imidazolidinone derivatives of the present invention may be prepared by reacting the corresponding unhalogenated 2-imidazolidinone with a source of chlorine, or, in the case of N-bromo-N'-chloro derivatives, first a source of chlorine and then a source of bromine. While elemental chlorine and bromine may be utilized, milder chlorinating/brominating agents may be used. Examples thereof include: N-chlorosuccinimide, N-bromosuccinimide, calcium hypochlorite, sodium hypochlorite, tertiary butyl hypochlorite, trichloroisocyanuric acid, N-chloroacetamide, N-chloro- or bromo-amines, etc. Halogenation of the unhalogenated 2-imidazolidinones may be accomplished in mixtures of water and common inert organic solvents, e.g., methylene chloride, chloroform and carbon tetrachloride, at room temperatures. Inert organic solvents may be used along with N-halamine halogenating reagents.

Unhalogenating tetraalkyl substituted 2-imidazolidinones may be prepared by first reducing the corresponding 2,3-dialkyl-2,3-dinitrobutane, e.g., 2,3-dimethyl-2,3-dinitrobutane, to the 2,3-dialkyl-2,3-diaminobutane, e.g., 2,3-dimethyl-2,3-diaminobutane, and then forming the 2-imidazolidinone by reacting the 2,3-dialkyl-2,3-diaminobutane with phosgene in basic solution. Such reduction step may be accomplished by the method described by J. Bewad, in the article, "Concerning Symmetrical Tertiary alpha Dinitroparrafin", *Ber.*, 39, 1231–1238 (1906). The 2-imidazolidinone may be synthesized by the method described by R. Seyre in the article, "The Identity of Heilpern's 'Pinacolylthiourea' and the Preparation of Authentic 2-Thiono-4,4,5,5-tetramethylimidazolidinone", *J. Am. Chem. Soc.* 77, 6689–6690 (1955). It is contemplated that other described 2-imidazolidinone derivatives may be prepared from the corresponding 1,2-substituted-1,2-diaminoethane, or by other organic synthetic routes known to those skilled in the art. For example, it is contemplated that 1,3-dichloro-4-methoxy-4,5,5-trimethyl-2-imidazolidinones may be prepared by cyclizing 2-methyl-3-methoxy-2,3-diaminobutane and chlorinating the resulting 4-methoxy-4,5,5-trimethyl-2-imidazolidinone. Similarly, it is contemplated that 1,3-dichloro-4-hydroxy-4,5,5-trimethyl-2-imidazolidinone may be prepared by cyclizing 2-methyl-3-hydroxy-2,3-diaminobutane and chlorinating the resulting 4-hydroxy-4,5,5-trimethyl-2-imidazolidinone.

The N,N'-dihalo-2-imidazolidinones described herein may be used to decontaminate toxic chemical agents such as blister agents, e.g., the sulfur mustards, and other toxic agents that are susceptible to oxidation by halogen. Alkaline aqueous solutions or emulsions of the N,N'-dihalo-2-imidazolidinones may also be used as decontaminant for toxic nerve agents, e.g., the VX and the G series.

The nerve agent VX is reported to have the following chemical graphic formula,

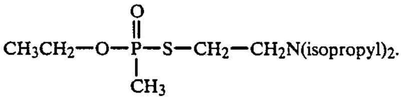

The G series of nerve agents include Tabun (GA), i.e., ethyl phosphorodimethylamidocyanidate, $[((CH_3)_2N)-P(O)(CN)OC_2H_5]$;

Sarin (GB), isopropyl methyl phosphonofluoridate $[CH_3P(O)(F)OCH(CH_3)_2]$;

Soman (GD), pinacolyl methylphosphonofluoridate $[CH_3P(O)(F)OCH(CH_3)C(CH_3)_3]$ The sulfur mustards include the compounds; bis(2-chloroethyl) sulfide (HD), $[ClCH_2CH_2SCH_2CH_2Cl]$;

1,2-bis(2-chloroethylthio)ethane (Q)

$[ClCH_2CH_2SCH_2CH_2SCH_2CH_2Cl]$;

bis(2-chloroethylthioethyl)ether (T), $[ClCH_2CH_2SCH_2CH_2OCH_2CH_2SCH_2CH_2Cl]$;

mixtures of compounds HD and Q, i.e., mustard and 1,2-bis(2-chloroethyl thio)ethane; and mixtures of mustard (HD) and T, i.e., mixtures of bis(2-chloroethyl) sulfide and bis(chloroethyl thioethyl) ether.

Decontamination of toxic chemical agents susceptible to oxidation by halogen may be accomplished by contacting the toxic chemical with a decontaminating amount of the described N,N'-dihalo-2-imidazolidinone. Commonly, the imidazolidinone decontaminating compound will be used in amounts such that at least one mole of the imidazolidinone compound is used for each mole of toxic chemical agent, i.e., at least an equal molar amount. In order to insure total detoxification, it is common to utilize a large excess of the decontaminating chemical compound i.e., the imidazolidinone, vis-a-vis the toxic chemical agent.

Decontamination may be accomplished by applying an aqueous solution or emulsion (hereinafter collectively referred to as an "emulsion") of the imidazolidinone in water or dissolved in an organic solvent that is part of an aqueous emulsion. Preferably, the emulsion of the imidazolidinone will have an alkaline pH, e.g, have a pH of between about 9 and about 11, e.g., about 10. More particularly, the aqueous emulsion (sans decontaminant) may comprise from about 25 to about 65 weight percent water, from about 5 to 45 weight percent organic solvent, e.g., chlorinated organic solvents, and from about 10 to about 30 weight percent of one or more surfactants, e.g., cationic emulsifiers. The aforedescribed formulations are representative only and solely for purposes of example. Depending on the organic solvent used and the amount of 2-imidazolidinone compound incorporated into the solvent, different amounts of water and surfactant may be required. Such amounts may be readily found without undue trial and error experimentation by one skilled in the art.

By way of further example, a common aqueous emulsion utilized for calcium hypochlorite or sodium dichloroisocyanurate is an emulsion comprising about 63 weight percent water, 7.4 weight percent tetrachloroethylene, 1,4 weight percent trimethyl $C_8$–$C_{10}$ quaternary ammonium chloride, 16.5 weight percent cetyl trimethyl ammonium chloride and 11.7 tetrabutyl ammonium hydroxide. This type of emulsion composition may be used with the imidazolidinones described herein.

The aqueous emulsion is commonly buffered with conventional buffering agents to a pH of from about 9 to about 11, e.g., about 10. An example of such a buffering agent is the sodium carbonate-sodium bicarbonate system.

Any conventional organic solvent that solubilizes the N,N'-dihalo-2-imidazolidinone, e.g., the common hydrocarbon (aromatic and paraffinic) solvents or halogenated hydrocarbon solvents may be used as the organic medium carrier for the imidazolidinone compound. In choosing a suitable organic solvent, the volatility, flammability and toxicity of the solvent should be considered, i.e., relatively non-volatile, non-flammable and non-toxic solvents should be selected. For example, there can be mentioned, tetrachloroethylene, trichloroethylene, tetrachloroethane, pentachloroethane, xylene, cyclohexanone or mixtures of organic solvents.

The N,N'-dihalo-2-imidazolidinone may be dissolved in the organic solvent to the extent of its solubility therein or to levels less than saturation. It is expected that the 2-imidazolidinone may be used in amounts sufficient to form about a 0.1 to about a 0.4 molar solution in the organic solvent.

In addition, it is contemplated that the N,N'-dihalo-2-imidazolidinone may be used as a decontaminant in the neat solid form or blended with a solid inert filler such as alumina, silica, etc.

The present invention is more particularly described in the following examples which are intended as illustrative only since numerous modifications and variations therein will be apparent to those skilled in the art.

EXAMPLE 1

Approximately 0.1 gram ($4.74\times10^{-4}$ moles) of 1,3-dichloro-4,4,5,5-tetramethyl-2-imidazolidinone was placed in a 5 millimeter (OD) NMR tube. Enough deuterochloroform ($CDCl_3$) was added to the NMR tube to a height of about 3 centimeters. All of the imidazolidinone dissolved readily. To a second identical NMR tube was charged several drops of the mustard simulant 2-chloroethyl sulfide to a height of about 0.5 centimeters (approximately $5.40\times10^{-4}$ moles). The mustard simulant was diluted to a height of 3 centimeters with deuterochloroform. A drop of tetramethylsilane, which werved as an NMR standard, was added to each tube. A proton NMR spectrum was recorded for each sample tube using a Varian EM 300 Spectrometer. The contents of the two NMR tubes were then mixed by adding the imidazolidinone solution to the mustard simulant solution at ambient temperature. A white suspension at the interface of the mixing was immediately observed, indicating that a chemical reaction had occurred. The resulting mixture was shaken thoroughly and a proton NMR spectrum of the reacting mixture recorded between the time of mixing and 6 minutes elapsed time. The NMR spectrum of the mixture differed markedly from that of the original spectra for the imidazolidinone and mustard simulant (new NMR bands occurred at $\delta$ 1.89 (doublet), $\delta$ 4.02 (doublet), $\delta$ 5.24 (multiplet), and $\delta$ 7.03 (broad unresolved). From such changes in the spectra, it was concluded that a rapid chemical reaction occurred which should also occur for the mustard agent, bis(2-chloroethyl) sulfide, since the art recognizes that 2-chloroethyl sulfide simulates well the reactions of bis(2-chloroethyl) sulfide.

The white suspension that occurred at the mixing interface was determined to be the unhalogenated 2-imidazolidinone precursor, i.e., 4,4,5,5-tetramethyl-2-imidazolidinone. It was concluded that the 2-imidazolidinone functions as a mild oxidizing agent in converting the sulfide simulant to sulfoxides and possible sulfones.

Although the present invention has been described with reference to specific details of certain embodiments thereof, it is not intended that such detail should be regarded as limitations upon the scope of the invention except as and to the extent that they are included in the accompanying claims.

I claim:

1. A method for decontaminating a toxic chemical agent susceptible to oxidation by halogen, which comprises contacting said chemical agent with a decontaminating amount of N,N'-dihalo-2-imidazolidinone represented by the graphic formula,

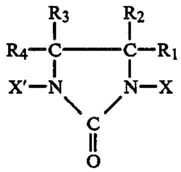

wherein X and X' are each halogen selected from the group consisting of chlorine and bromine, provided that at least one of X and X' is chlorine, $R_1$, $R_2$, $R_3$ and $R_4$ are each selected from the group consisting of hydrogen, $C_1$-$C_4$ alkyl, $C_1$-$C_4$ alkoxy, hydroxy and substituted phenyl, provided that not more than one of the $R_1$-$R_4$ is hydrogen, said phenyl substituents each being selected from the group consisting of $C_1$-$C_4$ alkyl, $C_1$-$C_4$ alkoxy and hydroxy.

2. The method of claim 1 wherein the toxic chemical agent is a blister agent.

3. The method of claim 2 wherein the blister agent is a sulfur mustard toxic agent.

4. The method of claim 3 wherein $R_1$, $R_2$, $R_3$ and $R_4$ are each selected from the group methyl and ethyl.

5. The method of claim 3 wherein $R_1$, $R_2$, $R_3$, and $R_4$ are each methyl.

6. The method of claim 3 wherein the N,N'-dihalo-2-imidazolidinone is 1,3-dibromo-4,4,5,5-tetramethyl-2-imidazolidinone, 1,3-dichloro-4,4,5,5-tetramethyl-2-imidazolidinone, 1-bromo-3-chloro-4,4,5,5-tetramethyl-2-imidazolidinone, or 1,3-dichloro-4,5,5-trimethyl-2-imidazolidinone.

7. The method of claim 6 wherein the blister agent is contacted with an aqueous emulsion of the N,N'-dihalo-2-imidazolidinone.

8. The method of claim 7 wherein aqueous emulsion contains an organic solvent as a solubilizer for the N,N'-dihalo-2-imidazolidinone.

9. The method of claim 8 wherein the aqueous emulsion has a pH of from about 9 to 11.

10. A method for decontaminating a toxic chemical agent selected from the group sulfur mustard agent and nerve agent, which comprises contacting said toxic chemical agent with an aqueous emulsion of an organic solvent having dissolved therein a decontamianting amount of an N,N'-dihalo-2-imidazolidinone selected from the group consisting of 1,3-dibromo-4,4,5,5-tetramethyl-2-imidazolidinone, 1,3-dichloro-4,4,5,5-tetramethyl-2-imidazolidinone, 1-bromo-3-chloro-4,4,5,5-methyl-2-imidazolidinone, and 1,3-dichloro-4,5,5-trimethyl-2-imidazolidinone, said aqueous emulsion having a pH of from about 9 to 11.

11. The method of claim 10 wherein the organic solvent is tetrachloroethylene and the N,N'-dihalo-2-imidazolidinone is present in the solvent in amount of from 0.1 to 0.4 molar.

* * * * *